United States Patent Office 3,199,107
Patented Aug. 3, 1965

3,199,107
RADAR TESTING EQUIPMENT
Kenneth D. Mills, Ancaster, Ontario, Canada, assignor to Canadian Westinghouse Company Limited, Hamilton, Ontario, Canada, a company of Canada
Filed Sept. 4, 1962, Ser. No. 223,865
16 Claims. (Cl. 343—17.7)

This invention relates to radar testing equipment and in particular to test equipment which is adapted to test pulse type radar systems.

Systems of radio detection and ranging generally referred to as radar systems are frequently installed in locations where testing during operation is virtually impossible.

For example, in an aircraft the radar system may well be in a location inaccessible to the operator of the aircraft. It is therefore critically important that the system should be tested and found operational before the aircraft leaves the ground. For such testing it is important that the test equipment should, if possible, completely avoid any modification of the normal mode of operation of the radar system and should also be as independent of the radar system as is possible.

Test equipment of the type intended for testing pulse radar, has of course been proposed in the past. Various equipments have been suggested which receive the pulse of energy from the radar transmitter and in response thereto re-radiate a signal comparable to a normal echo at a time subsequent to the initial transmission. The reception of such a re-radiated signal at such a time would create an indication in the radar system of a target at a specified range.

With modern airborne radar systems, it is necessary not only to simulate the targets at various ranges but also in most cases to simulate targets which are moving relative to the radar system not only in range but also in angle.

The radar test equipment should also be capable of indicating the condition of the radar transmitter and receiver, the precision of the radar calibration and the effectiveness of the radar's tracking ability. Further facilities may also be provided to measure the accuracy of the bearing indication of the radar system and also to test other equipment frequently associated with such radar systems, such other equipment for example may respond to infra red radiation.

All of these tests should be carried out in a situation as near to the normal operating condition of the system as is possible.

With prior test equipment, due to the mode of production of the signal simulating an echo, this signal may contain many unwanted frequencies in addition to the desired spectrum and it is difficult under these circumstances to properly evaluate the response of the radar system.

For example, if the re-radiated signal simulating the echo is produced by a heterodyne technique, the signal radiated will contain not only the desired frequency spectrum but also many unwanted side bands, all of which may have some effect on the radar system. The response of the radar receiver to a signal so produced is not necessarily the same as it would be to a signal produced by reflection of the radiation of the radar transmitter.

In prior test equipment simulation of a target moving in angle relative to the radar system, has been produced by an actual physical motion of the radiator of the test equipment with respect to the radar system. It is evident that this mode of producing angular relative motion, causes certain complexities in the antenna feed of the radar test equipment. Previous test equipment has also attempted to use a common antenna, both for the reception of the radar system transmitted pulse and also for the transmission of the simulated echo or target signal from the radar test equipment. Such an arrangement may give rise to problems due to the intercoupling between the transmission portion of the radar test equipment which is radiating the simulated echo and the receiving portion of the radar test equipment which is intended to receive the pulses transmitted by the radar system. The use of a single antenna also gives rise to problems if the radar system has an antenna which may be aimed in various directions which may greatly change the strength of the signal received by the test equipment antenna.

It is therefore an object of this invention to provide a radar test equipment capable of testing many important functions of a radar system in normal operation with a minimum of interference with characteristics of the radar system.

It is a further object of this invention to provide an improved radar test equipment capable of accurately measuring the characteristics of the radar system.

It is a still further object of this invention to provide a radar test equipment capable of simulating angular motion of the target without actual physical motion of the test equipment radiator.

These and other objects are obtained generally as follows:

In a controlled environment, a first antenna is used to derive a signal from the radar system. This signal is used to synchronize the radar test equipment and to lock it to the correct frequency. A microwave oscillator is included in the test equipment. This oscillator is locked in frequency to the signal derived as aforesaid. Pulses of energy from the microwave oscillator are fed to a plurality of antennas other than the first antenna by means of selectively switching the output from the microwave oscillator both in time, to simulate changes in range and to various of the latter antennas to simulate changes in angular direction of the target. Means are provided for measuring the power output of the radar transmitter by measuring the signal strength at one of the latter antennas and means are provided for varying the power level of the output from the microwave oscillator of the radar test equipment so that the sensitivity of the radar receiver may be measured. Since the frequency of the microwave oscillator is locked to that of the radar transmitter, a measure of the frequency of the microwave oscillator will be a measure of the frequency of the radar transmitter.

A clearer understanding of our invention may be had from the following description of an embodiment in which.

Figure 1:
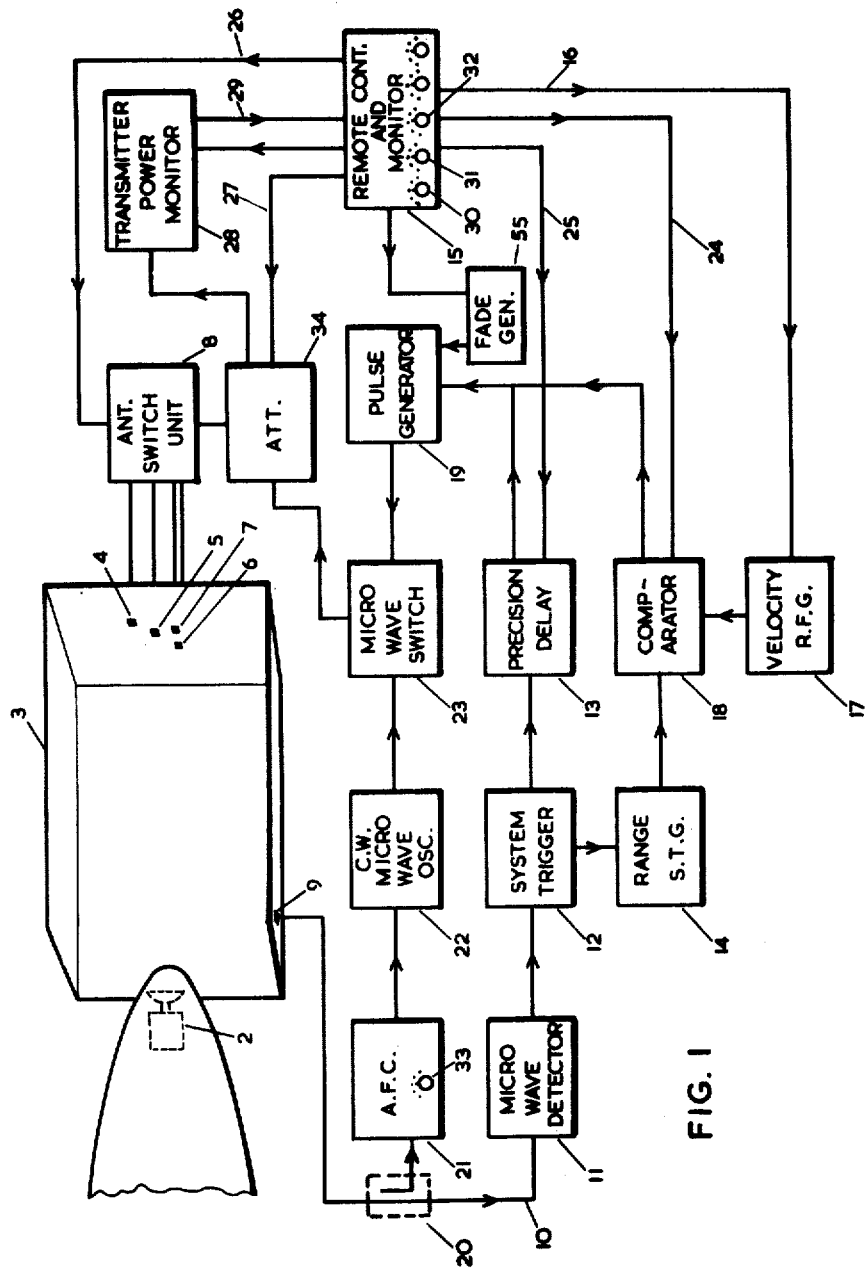
FIGURE 1 is a schematic diagram of the radar testing equipment.

Considering first FIGURE 1, there is shown the forward portion of an aircraft containing a part of a radar system and more particularly at 2 there is shown the radar antenna. The aircraft is so arranged that the antenna of the radar system intrudes into a box-like structure 3 referred to as an anechoic chamber. The near sidewall of this chamber has been omitted from the drawing for convenience of illustration. The advantage and character of this chamber will be subsequently described but for our present purpose it may be assumed to define an environment equivalent to free space. At the rear surface of the chamber are a plurality of microwave antennas 4, 5, 6 and 7. These various antennas are coupled to the antenna switching unit 8 which permits selected ones of the antennas to be connected to various elements in the equipment. Also intruding into the chamber 3 is a further microwave antenna 9 which is coupled through a waveguide 10 to microwave detector 11.

The output from the microwave detector 11 is connected to the system trigger 12. This is a unit capable of producing a clean pulse in response to a pulse input and may for example be a multivibrator synchronized by the input signal. The output from the system trigger is applied to two devices, first a precision delay line 13 and second, to a range saw tooth generator 14. A remote control and monitor unit 15 which is a portable device, is connected through cables to the rest of the test equipment, in particular through cable 16 to velocity ramp function generator 17. The outputs from the range saw tooth generator and the velocity ramp function generator are applied to comparator 18 and the output from this comparator and from the precision delay line are both applied to pulse generator 19.

A portion of the energy in waveguide 10 is applied through directional coupler 20 to the automatic frequency control 21. This automatic frequency control is utilized to control the frequency of the continuous wave microwave oscillator 22. The ouput from this microwave oscillator is applied to the antenna switch unit through the microwave switch 23 and attenuator 34. Microwave switch 23 is controlled by pulse generator 19 and as a result the power from the microwave oscillator 22 is applied to the antenna switch unit only when the microwave switch 23 is energized by the pulse generator 19. Attenuator 34 is controlled by the remote control and monitor unit and therefore the power supplied from the microwave oscillator to the antenna switch unit is determined by a control on the remote control and monitor unit.

Signals are also applied from the remote control and monitor unit 15 through cable 24 to the comparator 18 and through cable 25 to the precision delay device 13 and through cable 26 to the antenna switch unit 8. The antenna switch unit is coupled to the transmitter power monitor which in turn feeds an output into the remote control and monitor 15 via cable 29. The operation of this system may be explained as follows:

Let us assume that the radar system in the aircraft generates and radiates through antenna 2 pulses of microwave energy at a specific frequency and specific pulse recurrence frequency. As the aircraft is on the ground and it is desired to simulate the situation of the aircraft in flight, it is necessary that the antenna radiation should not be modified by reflections from surrounding objects.

To this end the anechoic chamber is used to surround the antenna. The anechoic chamber is so designed as to provide a simulation of free space. The design of such a chamber is now well understood by those skilled in the art. The inner surface of the chamber is lined with suitable absorbing material so that substantially no reflection occurs. The ideal situation of no reflection can, of course, never be attained and it is therefore advantageous that the chamber should be symmetrical so that any reflections which do occur, occur equally in all directions and may be largely neglected. The chamber also acts as a protective shield to protect those operating on the radar system and also as a shield to protect the radar system from adjacent noise for example adjacent radar systems.

Since the radar antenna may be a movable device capable of being directed at various angles relative to the aircraft, it may be difficult to locate the receiving antennas in the beam of the transmitting antenna. For this reason antenna 9 is mounted near to the front of the chamber. At this point it receives a more constant RF energy level from the radar transmitter irrespective of the direction of the radar antenna. The energy received by antenna 9 may be considered as spillover from antenna 2. Due to the positioning of this antenna 9 relative to the other antennas 4, 5, 6 and 7, the coupling between the receiver portion of the test equipment and the transmitter portion of the test equipment is sufficiently small as to reduce the chance of interference one with the other.

Let us assume therefore that a pulse is transmitted from antenna 2 and is received by antenna 9, passed through waveguide 10 to microwave detector 11 and produces an output pulse as shown at 3(a). From this impulse the system trigger 12 generates the reconstituted impulse as shown at 3(b). This pulse from the system trigger 12 is applied to two devices.

Let us consider first the precision delay 13 which is a unit capable of producing a precision delay of an input pulse. A suitable device is a magnetostrictive delay line as described in Electronic Industries for January and February 1962. Such a device on receipt of an impulse causes a similar pulse to travel down a metallic rod. At intervals along the rod pickup devices are positioned and by selecting the output from a specific pickup a specific precisely delayed impulse can be derived. It will be appreciated therefore that from the precision delay 13 can be derived any one of a series of precisely delayed pulses such as are illustrated at (c) in FIGURE 3. This system trigger pulse as shown at 3(b) is also applied to the range saw tooth generator 14 producing an output as shown at 3(d). The range saw tooth generator is a unit capable of producing a linearly decreasing voltage waveform upon receipt of a trigger pulse. Circuits such as the plantastron, sanatron, and boot strap are suitable and well known. The period "X" at (c) and (e) in FIGURE 3 is the periodicity of the radar system and is a function of the pulse recurrence frequency.

From the remote control and monitor device 15, a predetermined voltage is applied through line 16 to velocity ramp function generator 17. This voltage may be selected by adjusting control 30, for example. The velocity ramp function generator may conveniently be a Miller integrator and the output from the velocity ramp function generator which is applied to comparator 18 is as illustrated in FIGURE 3(e), a linearly varying voltage. This waveform has a duration depending upon the amplitude of the input and may be sloping up or down depending on the input polarity.

Figure 3:
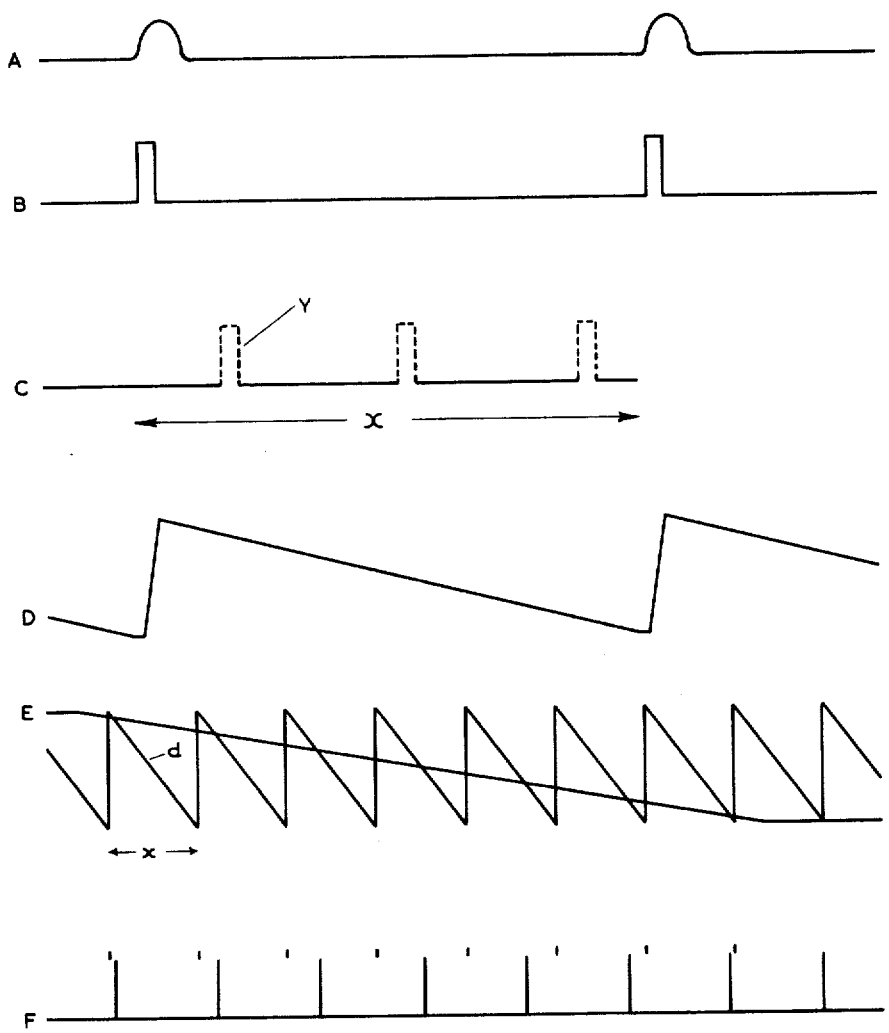
FIGURE 3 is a graphical representation of various wave forms present in various parts of the equipment.

It will be noted that the wave forms shown at (e) in FIGURE 3 are to a different time scale than the preceding wave forms and the dimension "X" as illustrated at 3(e) is therefore much shorter. The saw tooth waves designated (d) are representations of the range saw tooth illustrated at 3(d) to the new time scale. The ramp function illustrated at 3(e) which intercepts the smaller saw tooth (d) is the ramp function generated by the ramp function generator 17. The two wave forms shown at 3(e) are applied to the comparator 18, which produces a pulse each time there is a coincidence in voltage. The comparator may be any circuit capable of comparing two voltages and producing a pulse output when they are coincident. Since coincidence during the rise of saw tooth (d) is not desired the circuit preferably suppresses any pulses produced at this coincidence. A suitable circuit is a Schmitt trigger circuit arranged to change the conditions depending upon the polarity of the voltage difference between the grids of the two tubes. The Schmitt circuit is well known and has been described in the Journal of Scientific Instruments, 1938, XV, page 24. Desired pulses will have one polarity and those produced by flyback will have the opposite polarity. It is therefore convenient to reject the undesired pulses by the suitable application of a unidirectional conducting device. The resultant pulses are as shown at (f) in FIGURE 3. It will be appreciated that the wave form (d) always commences at the same time as the system trigger illustrated at 3(b) whereas the pulses shown at 3(f) occur at various times subsequent thereto. The outputs from both the comparator and the precision delay are applied to the pulse generator 19, however, only one output occurs at any time and the outputs are selectable. By controlling the signal applied to conductor 25 by adjustment of control knob 31, the operator may select either a series of pulses delayed by a specific period of time by delay device 13 relative to the system trigger or alternatively he may prevent any output from the precision delay device and instead derive the output from comparator 18. The output from comparator 18 of course will depend upon the output from the velocity ramp function generator. By adjustment of the voltage applied to conductor 16, rate of change of range for a period of time may be adjusted and hence a relative velocity of the apparent echo may be adjusted. Alternatively the ramp function generator 17 may be made inoperative by applying no voltage to conductor 16 and a specific voltage may be applied to conductor 24. The voltage on conductor 24 is compared to the output from the range saw tooth generator and produces an output pulse each time they are coincident. The voltage on conductor 24 is adjusted by control 32 which therefore enables the operator to produce a pulse at a specified range in accordance with the position of the control which may be conveniently calibrated in range.

The pulses as determined by the operator by manipulation of the remote control unit are applied to pulse generator 19 which produces a pulse for every input pulse. This circuit is substantially only an amplifier with one additional function. Connected to the pulse generator is a fade generator 55 which in turn is connected to the remote control and monitor unit 15. When a control voltage is applied from unit 15 to fade generator 55 a signal of specific amplitude and duration is applied from the fade generator to the pulse generator. The output from pulse generator 19 is suppressed for the duration of this signal. The fade generator may be any suitable monostable device such as a flipflop which is triggered into its unstable condition by the control voltage and reverts to its stable condition after a predetermined time.

The output from the pulse generator is then applied to the microwave switch which permits a pulse of microwave energy to be transmitted from the continuous wave microwave oscillator 22 to the antenna switching unit each time the pulse generator operates. The frequency of the microwave oscillator is determined by the automatic frequency control circuit 21 which, it is noted, derives a portion of the energy from the waveguide 10 through directional coupler 20. This automatic frequency control system ensures that the microwave oscillator is tuned to essentially the same frequency as the transmitter of the radar system. A preferred form of automatic frequency control for such a system is described and claimed in copending application No. 206,455, Dennis A. Stonelake, inventor, filed June 29, 1962, and assigned to the assignee of the present application.

It will be understood that various means are known for comparing the frequency of the energy received on waveguide 10 to the frequency of the microwave oscillator and in some manner ensuring that they are the same frequency. It should be noted however that for proper operation of the system, the energy supplied to the microwave switch 23 from the microwave oscillator must be of the same nature as the energy produced by the radar transmitter, that is the frequency spectrum of the impulses produced by the microwave switch should be the same as the spectrum produced by the radar transmitter itself and should not contain energy at other frequencies which would lead to deceptive results.

The control 33 on the automatic frequency control system 21 is connected to the servo mechanism of the automatic frequency system and it enables the operator to read directly from the control, the actual frequency of the transmitter. This is possible since the AFC system continually tunes the microwave oscillator and the position of control 33 is therefore a measure of the frequency of the transmitter.

Let us now assume that energy from the microwave oscillator is applied in pulses to the antenna switch unit from the microwave switch and from the antenna switch unit to one of the transmitting antennas, for example antenna 5. The energy radiated by this antenna is received by antenna 2 and appears to the radar system as a normal echo signal. The time position of this signal is determined by the pulse generated by the pulse generator. The time position of the pulse generated by the pulse generator in turn is controlled by the comparator circuit or by the pulses from the precision delay device 13. The time controlled pulse of RF energy transmitted from antenna 5 therefore is received by the radar system and displayed in a normal manner. If the remote control and monitor device is adjusted to produce from the precision delay line, a delayed pulse having a specific time delay after the system trigger than the pulse of energy will be transmitted from antenna 5 at a later time as indicated for example by pulse "Y" at (c) in FIGURE 3. Since the time position of pulse "Y" is precisely determined by the delay in the device 13, the radar system calibration may be checked to determine whether it is in accordance with the known delay of the precision delay device.

Alternately it is possible to apply an adjustable voltage on conductor 24 and produce an adjustable delay which will indicate the effect of various ranges on the radar system.

It is further possible to produce a specific voltage on conductor 16 by adjustment of the controls on the remote control and monitor device 15 and cause a continuously varying range for a predetermined length of time, to determine whether the system operates normally to indicate such varying range and also, if such facilities exist in the radar system, to provide proof of the operability of the automatic range following which when properly operating ensures that the system once locked on target continues to lock on target as the range varies.

A further test may be carried out by means of the signals applied to cable 26 to control the switching of the microwave pulse output to various antennas, that is for example switching at first to antenna 4 and then to antenna 5, and then to antenna 6, over a given period of time. In this manner it is possible to simulate, so far as the radar system is concerned, a target moving angularly with respect to the radar system. It is thus possible to check that the radar display properly indicates the motion of the target and also to determine whether the tracking system of the radar system operates properly. As the target moves with respect to the radar system with a certain given angular velocity, the antenna should follow the apparent location of the target.

To test the capabilities of the radar tracking, range following and general stability during fading of the signal the fade generator 55 is introduced. In normal operation it is not unusual for the target to disappear from the system view for short periods of time for various reasons. To simulate this effect the fade generator on being energized from the remote control and monitor produces an impulse which suppresses the output from the microwave switch for a predetermined period of time corresponding to a normal fade period. The operator can then observe whether the radar system retained track and range or whether it lost the target.

By a further control signal applied to cable 26, it is possible to provide for monitoring of the radar transmitter power. In this mode a portion of the energy received from antenna 5 is applied to the antenna switch unit and through attenuator 34 to the transmitter power monitor 28.

The transmitter power monitor includes a bridge whose unbalance is indicated by a meter in remote control and monitor device 15. The bridge is initially balanced, it is then unbalanced by the application of a known power level, to a power sensitive portion of the bridge. The meter reading is noted for future reference and subsequently any power level greater than this at the antenna switch unit can be measured by adjusting the attenuator 34 until the meter reads as before. The power at the antenna switch unit can then be computed from the attenuator position and the known power originally used for calibration. Attenuator 34 is controllable from the remote control and monitor 15 via control conductor 27. The output from power monitor 28 is applied to a meter in the remote control and monitor 15 via conductor 29.

Finally, in any of the preceding tests where the receiver of the radar system is being utilized, the sensitivity of the receiver can be checked by controlling the output from the microwave switch to the antenna switching unit. Attenuator 34 is adjustable from the remote control and monitor device as previously indicated. By adjustment of attenuator 34 the power of the microwave pulses transmitted from the antennas may be varied and the minimum level of transmitted power to which the receiver will respond may be determined. The attenuator 34 is, of course, calibrated in its adjustment and the control on the remote control monitor which controls the attenuator may be calibrated in receiver sensitivity. This also enables the response of the radar system as a whole to be checked for sensitivity to determine whether it will perform its normal acquisition and tracking functions in the presence of weak responses.

Figure 2:
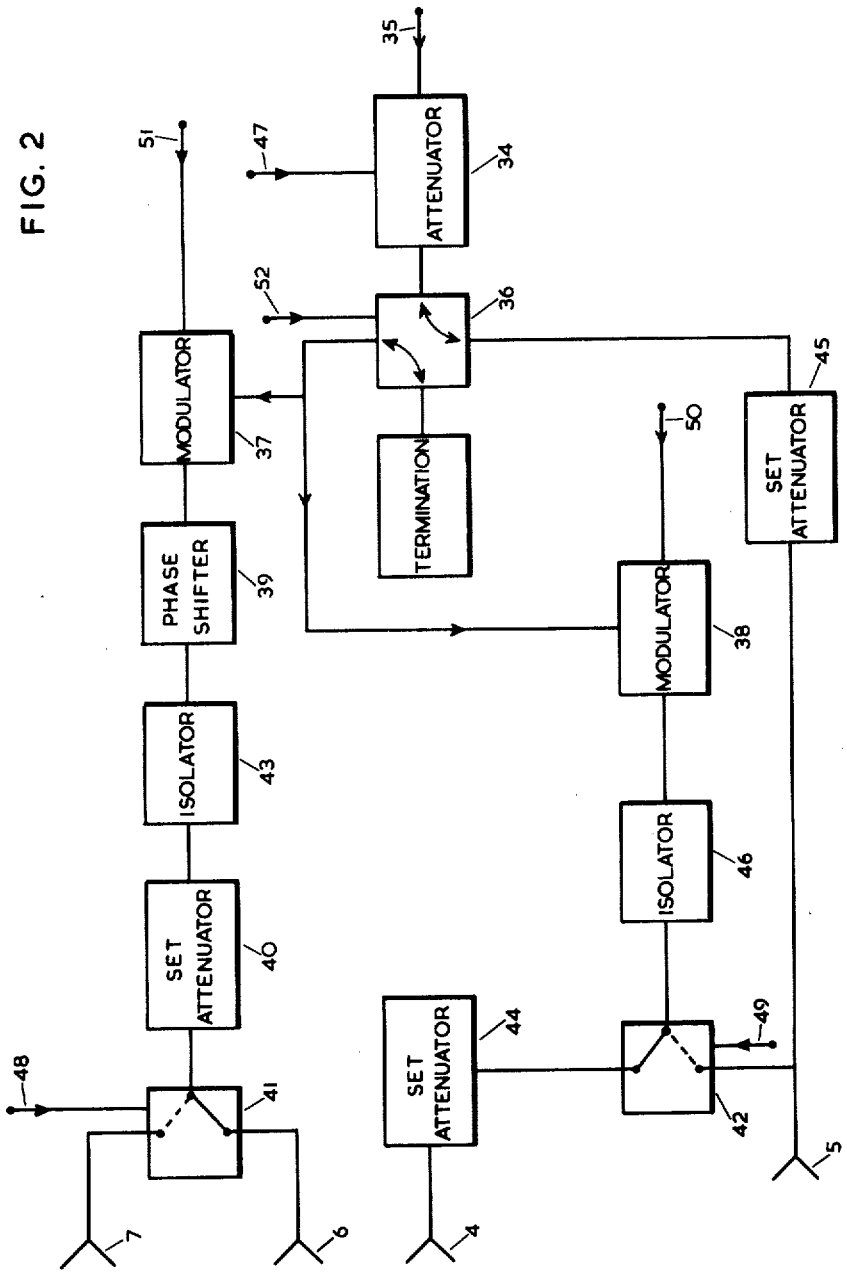
FIGURE 2 is a more detailed schematic diagram of a portion of the equipment.

The operation of this system in some of the various modes depends upon the operation of the antenna switching unit and therefore this portion of the system is more completely described in association with FIGURE 2 which is a more detailed schematic diagram of the antenna switching unit designated 8 in FIGURE 1.

As will be seen in FIGURE 2, antennas 4, 5, 6 and 7 may be alternatively connected through the antenna switch unit to the remainder of the radar test system.

As shown, the antenna switch unit is arranged for monitoring transmitter power. Signals received by antenna 5 are passed through attenuator 45 and selective coupler 36 to attenuator 34 which is connected at terminal 35 to the transmitter power monitor 28. Switch 42 is in its upper position and therefore does not connect antenna 5 to isolator 46. Switches 41 and 42 are electrically controlled switches and in the position shown, antenna 4 is connected through attenuator 44 to switch 42 through isolator 46 to modulator 38. Similarly antenna 6 is connected through switch 41, attenuator 40, isolator 43, phase shifter 39 to modulator 37. When it is desired to radiate signals from antennas, the selective coupler 36 must be rotated ninety degrees thus connecting terminal 47 through attenuator 34 and selective coupler 36 to the modulators 37 and 38. Selective coupler 36 is also electrically controlled and this rotation is caused by a signal applied to terminal 52 from cable 26. Terminal 47 is connected to microwave switch 23 and therefore microwave energy is applied to modulators 37 and 38. This energy is transmitted through the modulators 37 and 38 but its amplitude is controlled by the signals on terminals 50 and 51. These terminals are supplied with signals from cable 26 and control the amount of microwave energy transmitted by the modulators from essentially zero to a maximum depending upon the signals applied to terminals 50 and 51. The microwave energy now travels through phase shifter 39, isolator 43 and attenuator 40 and switch 41 to antenna 6, and/or, depending upon the condition of modulators 37 and 38, through isolator 46, switch 42, attenuator 44, to antenna 4. Alternatively by changing the condition of switch 42, the signal may proceed from isolator 46 to antenna 5.

In operation, the operator will establish the position of selective coupler 36 from the remote control and monitor device.

Let us assume it is desired to simulate a moving target in which case the selective coupler 36 will be rotated ninety degrees from the position shown. The energy will be applied to terminal 47 and from thence to the modulators 37 and 38. A signal is now applied to terminal 50 to permit the full microwave energy to proceed through the modulator 38, isolator 46, switch 42, attenuator 44 and be radiated from antenna 4. At the same time a signal is applied to terminal 51 to prevent the transmission of energy through modulator 37. Subsequently, a signal on cable 26 causes switch 42 to be actuated into its opposite position thus connecting the microwave energy to antenna 5. After a further period of time the signals on modulators 50 and 51 are reversed so that the microwave energy is prevented from passing through modulator 38 but is permitted to travel through isolator 37 and thence out through antenna 6.

It will be seen therefore that at first the simulated echo appears to originate from antenna 4, next from antenna 5 and then from antenna 6. This causes the simulated echo to appear to originate from a target which is moving with an angular velocity relative to the radar system. During this operation the operator may observe the operation of the radar system and determine whether the display indicates such motion of the target and he may also observe to determine whether the system properly responds to the angular motion of the target by, for example, following the target with the radar antenna. Due to the oblique arrangement of antennas 4, 5 and 6 the tracking ability of the system is tested in both azimuth and elevation modes simultaneously.

It will be appreciated that while only a single line is shown for cable 26 that as many conductors may be utilized as are necessary to provide various signals to electrically controlled selective coupler 36, modulators 37 and 38, and electrically controlled switches 41 and 42.

Since the remote control and monitor apparatus 15 is portable and connected through long flexible leads to the remainder of the apparatus it is possible for the operator to carry the device into the aircraft cockpit and control from that position the various modes of operation of the test equipment and also simultaneously to observe the effects on the radar system or the effectiveness of the radar system including transmitter power measurements, radar receiver sensitivity and tracking functions.

It will also be noted that the test equipment as described is wholly independent of the radar system except with respect to the normal radiations of the system in its normal manner.

Within compartment 3 there may be further facilities for calibrating or evaluating the radar system. For example, at the end of the chamber, in proximity to the antennas 4, 5 and 6, there may be a source of infra red radiation. This source may be filtered to provide the desired infra red radiation band and may also be controlled for example by means of an iris to produce a variable or desired radiation intensity.

The effect of the radiation may be observed by the operator performing the tests. This may have particular application for example where an infra red detector is utilized for fire control or where an infra red radiation sight head is included in the overall aircraft system. Provision may be made for checking the bore sighting of the antenna 2. To this end suitable crosshairs may be provided at the back of the chamber. These crosshairs may be illuminated and must be specifically located with reference to the antenna 5. In use the bore sighting telescope of the radar system will be used to locate the crosshairs after the antennas have been located with reference to the electrical axis.

In this mode of operation a signal can be transmitted from antenna 5, for example, and the antennas adjusted until antenna 5 is on the electrical axis of the antenna 2. Adjustment of the relative positions of antennas 2 and 5 may be conveniently made by moving antenna 5 since location of the mechanical axis of antenna 2 may be established by the aircraft position. To this end antennas 4, 5, 6 and 7 may all be mounted on a common antenna board which is adjustable in horizontal and vertical directions preferably remotely through servo controls in remote control and monitor device 15. In this case the crosshairs must be mounted on the antenna board so that their position relative to antenna 5 remains fixed. By viewing through the bore sighting telescope it can then be determined whether the electrical axis agrees with the mechanical axis and any adjustment to ensure their parallelism can then be made.

As previously indicated, characteristics of the chamber should be made to approach that of free space as closely as possible and where this is not fully possible, the chamber should at least be symmetrical, thus avoiding distortion of the electrical axis of the system and assisting in the latter test, that is the test for electrical axis parallelism with the mechanical axis.

It will be appreciated that various minor modifications in the arrangement and provisions of this system may be made depending upon the circumstances. The precise design of the chamber will vary depending upon the location of antennas 4, 5 and 6, relative to each other within the end wall and will vary depending upon the characteristics of the radar system. The number of controls available to the operator at the remote controls and monitor device will depend upon the number of tests which it is desired to perform.

Where desirable further functions may be added to the system and in particular provision may be made for compensating signal intensity for range. It will be understood that for a given power output from the radar transmitter the strength of a reflected and received signal will in normal operation depend upon the target range. The change in signal strength will obey a fixed law for example, $$S_r = \frac{S_t}{R^4} \cdot k$$

where $S_r$ is the received signal, $S_t$ is the transmitted signal, R is the range, and $k$ is a factor depending on various things such as the target size, ambient conditions etc. Compensation in accordance with this function can be made by utilizing a signal from velocity ramp function generator 17 which is a function of range and using it to vary the maximum conductivity of microwave switch 23 or to vary the setting of attenuator 34.

It will also be appreciated that the controls shown in the remote control monitor device are shown as connected to conductors to various devices. These conductors could, of course, be replaced by servo loops permitting the actual physical control of the device to be performed at the device following the adjustment of the control in the remote control and monitor device. For example, the position of control 33 can be indicated at the remote control and monitor by means of a closed servo loop and the adjustment of attenuator 34 can be made by means of a closed servo causing actual mechanical adjustment of the attenuator 34 at the attenuator by means of mechanical motion of a control at the monitor.

What I claim is:

1. A test equipment for a radar system comprising a signal generator for producing signals simulating the signals received by the radar system reflected from a target, an anechoic chamber, a plurality of antennas mounted at one end of said chamber, switching means to selectively connect any one of said antennas to said signal generator and permit radiation of said signals from said antennas in accordance with a predetermined sequence creating a simulation of relative angular motion between said radar system and a target, a further antenna mounted near the opposite end of said chamber and means to utilize the signal received by said further antenna to control the operation of said signal generator.

2. A test equipment for a pulse radar system comprising a signal generator for producing pulses of radio frequency energy of fixed duration controllable in frequency and periodicity, an anechoic chamber, open at one end, a plurality of first antennas mounted at the closed end of said chamber, a second antenna mounted near the open end of said chamber and recipient of radiation from a pulse radar system, an automatic frequency control coupled to said second antenna controlling the frequency of said signal generator in accordance with the frequency of said radar system, a detector coupled to said second antenna deriving from said radiation pulses representative of the envelope of the radio frequency energy radiated by said radar system and controlling the periodicity of said generator in accordance with said last said pulses and switching means selectively connecting said first antennas to said signal generator permitting radiation of said pulses of radio frequency energy from selected ones of said first antennas in accordance with a predetermined sequence creating thereby a simulation of angular relative motion between said radar system and a target.

3. A test equipment as claimed in claim 2 wherein the pulses of radio frequency energy produced by said generator are variable in amplitude.

4. A test equipment as claimed in claim 2 wherein the pulses of radio frequency energy radiated from said first antennas are variable in amplitude in accordance with a predetermined function.

5. A test equipment as claimed in claim 2 wherein the pulses of radio frequency energy produced by said generator are suppressed for a predetermined period of time in response to a control signal.

6. A test equipment as claimed in claim 2 wherein the pulses of radio frequency energy produced by said generator are produced a predetermined time after the pulse derived by said detector.

7. A test equipment as claimed in claim 2 wherein the pulse of radio frequency energy produced by said generator are produced an interval of time after the pulse derived by said detector said interval being variable in accordance with a predetermined function.

8. A test equipment as claimed in claim 2 wherein one of said first antennas not connected to said signal generator is switchably connected to a power monitor to measure the radio frequency power radiated by the said pulse radar system.

9. A test equipment as claimed in claim 2 wherein the selection of the connection of said first antennas is controllable from a remote portable control apparatus.

10. A test equipment as claimed in claim 3 wherein the amplitude of said pulses of radio frequency energy is controllable from a remote portable control apparatus.

11. A test equipment as claimed in claim 4 wherein the predetermined function is controllable from a remote portable control apparatus.

12. A test equipment as claimed in claim 7 wherein the predetermined function is controllable from a remote portable control apparatus.

13. A test equipment as claimed in claim 2 wherein the pulses of radio frequency energy produced by said generator are produced an interval of time after the pulse derived by said detector said interval being variable in accordance with a first function and the amplitude of said pulses is variable in accordance with a second function.

14. A test equipment as claimed in claim 13 wherein said second function is related to said first function.

15. A test equipment for a radar system comprising a signal generator for producing signals simulating the signals received by the radar system reflected from a target, an anechoic chamber, a plurality of antennas mounted at one end of said chamber, switching means to selectively connect any one of said antennas to said signal generator and permit radiation of said signals from said antennas in accordance with a predetermined sequence creating a simulation of relative angular motion between said radar system and a target, a further antenna mounted near the opposite end of said chamber and means to utilize the signal received by said further antenna to control the frequency of operation of said signal generator.

16. A test equipment for a radar system comprising a signal generator for producing signals simulating the signals received by the radar system reflected from a target, an anechoic chamber, a plurality of antennas mounted at one end of said chamber, switching means to selectively connect any one of said antennas to said signal generator and permit radiation of said signals from said antennas in accordance with a predetermined sequence creating a simulation of relative angular motion between said radar system and a target, a further antenna mounted near the opposite end of said chamber and means to utilize the signal received by said further antenna to control the periodicity of operation of said signal generator.

References Cited by the Examiner

UNITED STATES PATENTS

| 2,444,425 | 7/48 | Busignies | 343—115 |
| 3,035,229 | 5/62 | Guderian et al. | 343—17.7 |
| 3,110,026 | 11/63 | Barbour | 343—17.7 |
| 3,138,797 | 6/64 | Steinberg | 343—17.7 |

CHESTER L. JUSTUS, *Primary Examiner.*